March 13, 1934.　　P. I. CHANDEYSSON　　1,951,272
HOMOPOLAR PIPE WELDING GENERATOR
Filed Oct. 24, 1930　　2 Sheets-Sheet 1
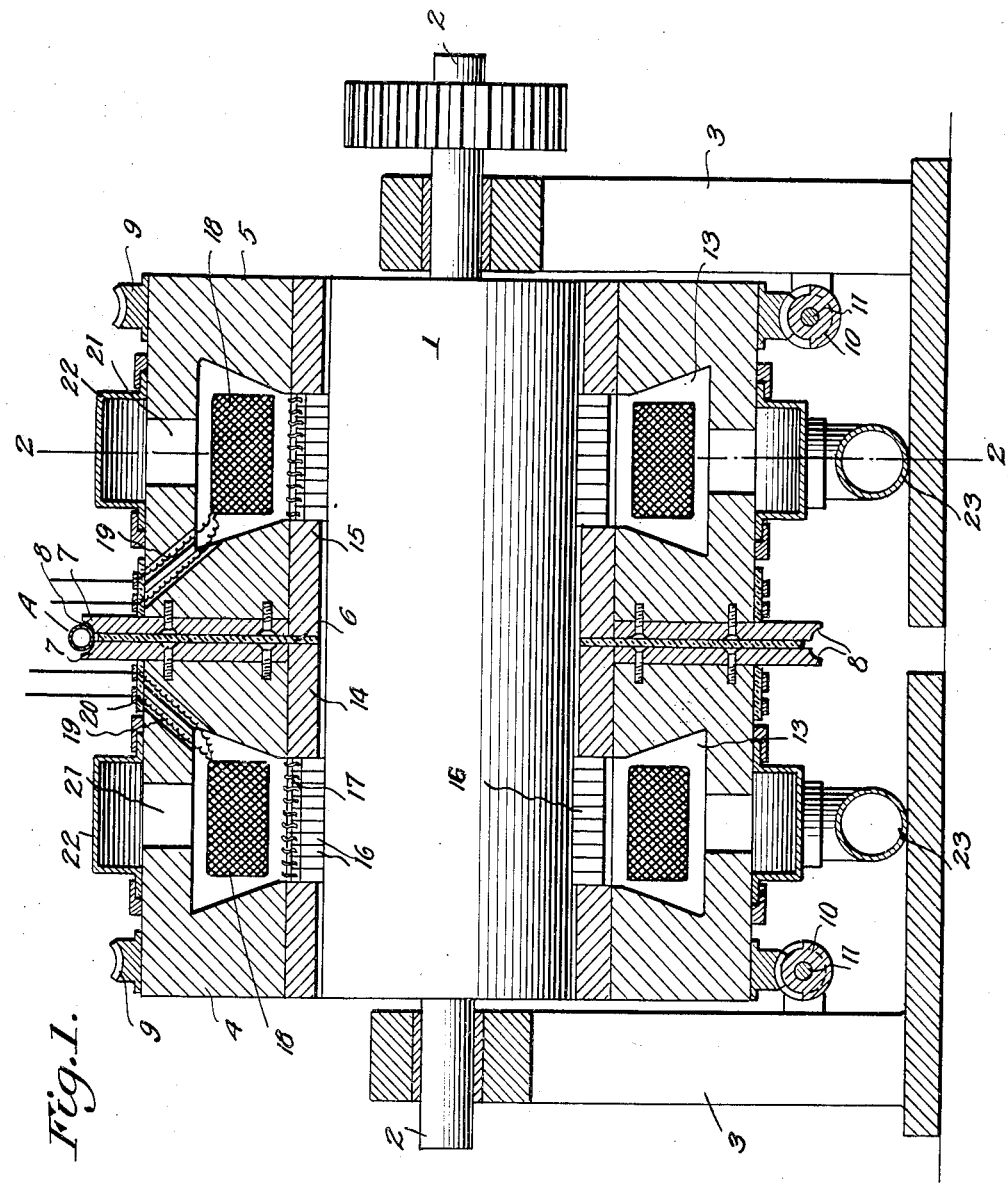
Fig. I.
Pierre I. Chandeysson
INVENTOR
BY Victor J. Evans
ATTORNEY

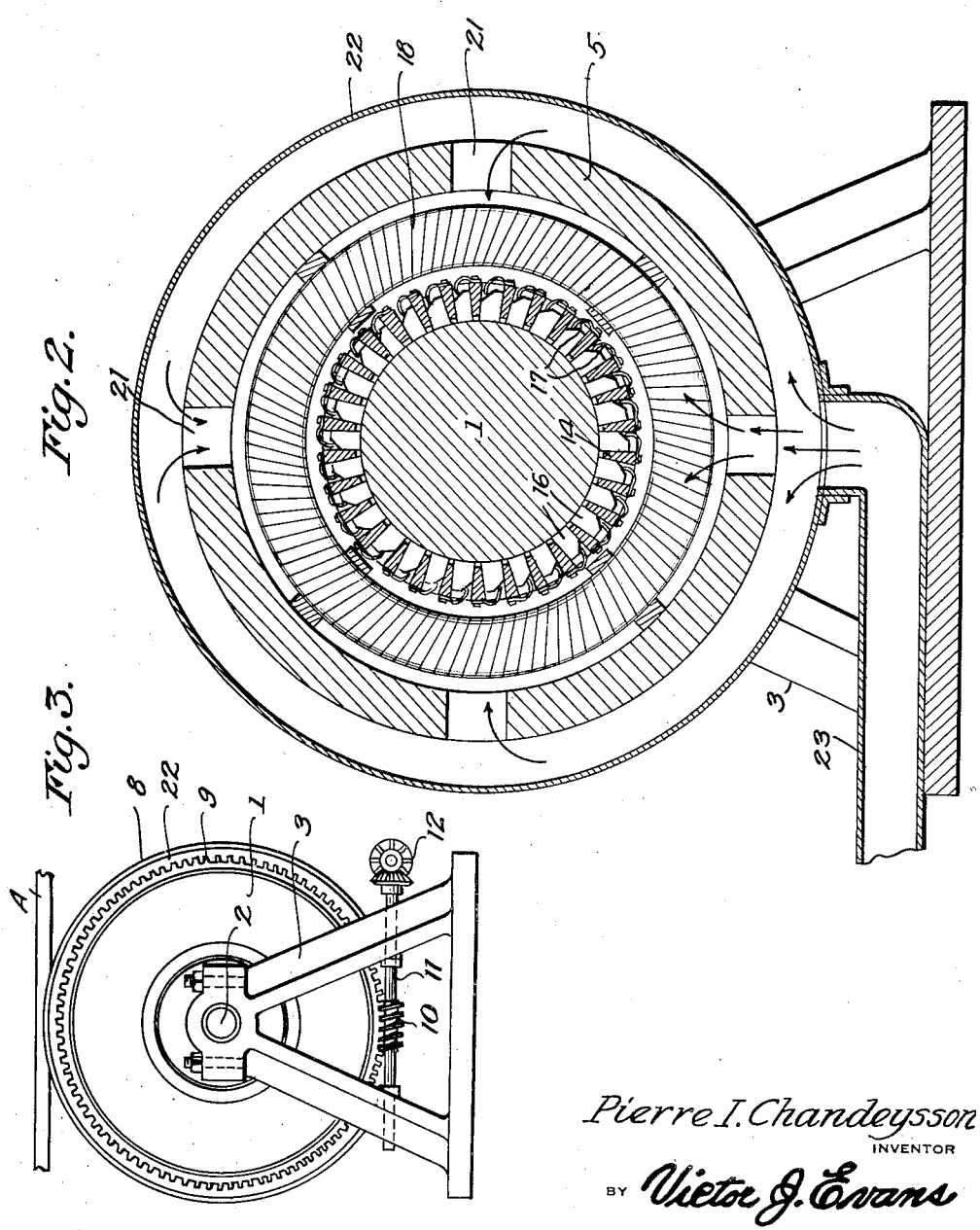

Patented Mar. 13, 1934

1,951,272

UNITED STATES PATENT OFFICE 1,951,272

HOMOPOLAR PIPE WELDING GENERATOR

Pierre I. Chandeysson, St. Louis, Mo.

Application October 24, 1930, Serial No. 491,022

1 Claim. (Cl. 219—6)

This invention relates to a homopolar pipe welding generator, the general object of the invention being to provide means for producing a direct current by a homopolar generator which is formed of two sections provided with welding means so that when the sections are rotated, a pipe or the like will be welded by the device.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a longitudinal sectional view through the device.

Figure 2 is a section on line 2—2 of Figure 1.

Figure 3 is an end view.

In these drawings, the numeral 1 indicates the drum of magnetic material and having the trunnions 2 at its ends which are rotatably supported in the uprights 3. This drum may be provided with a sleeve of copper, brass or any other suitable material, and may be rotated from any suitable source. A casing surrounds the drum and is composed of the sections 4 and 5 which are insulated from each other, as shown at 6. The sections are also composed of magnetic material and welding rings 7 are attached to the inner ends of the sections and these rings are separated from each other by the non-conducting member 6. The peripheries of the rings are grooved to form the semi-circular groove 8, the walls of which perform the welding action on the pipe A or other article to be welded.

Each section carries an annular worm gear 9 which is engaged by a worm 10 on a shaft 11 journaled in the upright and rotated through means of the gears 12 from any suitable source. Such driving means for the sections must be insulated from the sections. Each section is formed with an annular space 13 which opens out into the bore of the section and brush holders, carried by the rings 14 and 15 connected with the inner circumferences of the sections, support the brushes 16 which are connected to the holders by the conductors 17. These brushes, of course, contact the drum so that current flows from the drum through the brushes and the section to the ring 7. A coil 18 is placed in the space 13 of each section and each coil is connected with a source of electrical supply through means of the conductors 19 and the brush means shown generally at 20, so that current can be supplied to the coils without interfering with the rotary movement of the section.

From the foregoing it will be seen that the two sections being insulated from each other and the brush holders not being insulated from the sections, the two sections have a different potential from one another. Thus the apparatus will weld a pipe or the like positioned as shown at A in Figure 1, by a direct current produced by the device.

The spaces 13 are placed in communication, by the ports 21, with the circular casings 22 which are so connected with the sections that the sections can rotate while the casings remain stationary. These casings are connected by the conduits 23 with a source of compressed air so that this air will force the brushes against the drum and also act to cool the parts. If the brushes are to be held against the drum by vacuum means, the casings would be placed so that they will communicate with the spaces between the sections and the drum and suitable vacuum means connected with the casings so that the vacuum will hold the brushes against the drum. Of course, the casings must be insulated in any suitable manner so that they will not ground the sections.

Thus I have provided a welding apparatus which produces a direct current and when the sections are rotated, the grooved portions of the rings 7 will weld an object passing through a portion of the groove, the object acting as means for electrically connecting the sections together.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

Welding apparatus comprising a rotary drum, a pair of casings in surrounding relation to the drum, the casings being of magnetic material and provided with exciting windings, brush carrying members carried by each casing and having brushes bearing on the drum, a peripherally grooved welding member consisting of closely related but insulated elements of which one is mounted on each casing, and means for imparting angular or turning movement to the casings independently of the drum, the exciting coils being mounted in clearance spaces in said casing, circular casings surrounding the first said casings and slidably connected therewith, the first said casing having ports of communication between said second casings and said spaces and conduits for supplying air under pressure to said circular casings, said brushes being subject to the pressure in air from said spaces to maintain them in firm contact with said drum.

PIERRE I. CHANDEYSSON.